United States Patent
Inoue et al.

(10) Patent No.: US 7,679,760 B2
(45) Date of Patent: Mar. 16, 2010

(54) PRINTING SERVICE SYSTEM AND PRINTING SERVICE PROGRAM

(75) Inventors: Hiroshi Inoue, Tokyo (JP); Kazutomo Tawa, Tokyo (JP); Masato Sakui, Tokyo (JP); Masaki Omata, Tokyo (JP); Hiroki Nomura, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 1728 days.

(21) Appl. No.: 10/829,295

(22) Filed: Apr. 22, 2004

(65) Prior Publication Data

US 2004/0233471 A1 Nov. 25, 2004

(30) Foreign Application Priority Data

Apr. 25, 2003 (JP) .............................. 2003-122034

(51) Int. Cl.
*G06K 15/00* (2006.01)
*G06F 3/12* (2006.01)
*G06F 15/16* (2006.01)
*G06F 15/173* (2006.01)
*H04N 1/00* (2006.01)
*H04N 1/44* (2006.01)

(52) U.S. Cl. ..................... 358/1.14; 358/1.15; 358/403; 709/206; 709/223; 380/243; 380/246

(58) Field of Classification Search ............ 379/100.07, 379/100.04; 358/468, 407, 402, 404, 518, 358/1.18, 1.15, 403, 1.14, 1.13, 1.12; 705/2, 705/58, 51, 75, 73, 26, 71, 43, 64; 348/231.9, 348/552, 239, 231.3; 380/54; 709/206, 223; 715/839; 718/102; 382/233, 100; 400/61; 700/241; 434/350

See application file for complete search history.

(56) References Cited

U.S. PATENT DOCUMENTS 5,295,181 A * 3/1994 Kuo ....................... 379/100.07

(Continued)

FOREIGN PATENT DOCUMENTS

EP 0930774 A2 7/1999

(Continued)

*Primary Examiner*—Twyler L Haskins
*Assistant Examiner*—Jonathan R Beckley
(74) *Attorney, Agent, or Firm*—Birch, Stewart, Kolasch & Birch, LLP

(57) ABSTRACT

A printing service system is provided. A print terminal includes a data transmission and reception unit for transmitting and receiving image data to and from a server and a key input unit for inputting an address of a recipient authorized to print the image data. The server includes a data accumulation unit in which image data uploaded from the print terminal is accumulated for each ID, a code conversion unit for converting an ID and a password into a code, a mail output unit and a FAX output unit for transmitting the code to the address, and an image management unit for, when the print terminal returns the code to the ID and the password and transmits the ID and the password, performing authentication, reading the image data corresponding to the ID, and returning the image data to the print terminal.

13 Claims, 13 Drawing Sheets

U.S. PATENT DOCUMENTS

| | | | | |
|---|---|---|---|---|
| 5,438,433 | A * | 8/1995 | Reifman et al. | 358/468 |
| 5,523,854 | A * | 6/1996 | Hornsby | 358/407 |
| 5,524,073 | A * | 6/1996 | Stambler | 705/75 |
| 5,539,530 | A * | 7/1996 | Reifman et al. | 358/402 |
| 5,619,571 | A * | 4/1997 | Sandstrom et al. | 705/58 |
| 5,701,183 | A * | 12/1997 | Bellemare et al. | 358/404 |
| 5,784,461 | A * | 7/1998 | Shaffer et al. | 705/51 |
| 5,832,092 | A * | 11/1998 | Okuda et al. | 380/279 |
| 5,861,918 | A * | 1/1999 | Anderson et al. | 348/231.9 |
| 5,936,541 | A * | 8/1999 | Stambler | 705/75 |
| 5,953,504 | A * | 9/1999 | Sokal et al. | 709/227 |
| 6,017,157 | A * | 1/2000 | Garfinkle et al. | 396/639 |
| 6,104,396 | A * | 8/2000 | Hanaoka et al. | 715/839 |
| 6,122,403 | A * | 9/2000 | Rhoads | 382/233 |
| 6,128,415 | A * | 10/2000 | Hultgren et al. | 382/276 |
| 6,144,848 | A * | 11/2000 | Walsh et al. | 455/419 |
| 6,167,382 | A * | 12/2000 | Sparks et al. | 705/26 |
| 6,233,565 | B1 | 5/2001 | Lewis et al. | 705/35 |
| 6,327,049 | B1 * | 12/2001 | Ohtsuka | 358/1.18 |
| 6,337,712 | B1 * | 1/2002 | Shiota et al. | 348/231.1 |
| 6,369,908 | B1 * | 4/2002 | Frey et al. | 358/1.15 |
| 6,396,537 | B1 * | 5/2002 | Squilla et al. | 348/239 |
| 6,438,584 | B1 * | 8/2002 | Powers | 709/206 |
| 6,515,765 | B1 * | 2/2003 | Umebayashi | 358/1.9 |
| 6,545,767 | B1 * | 4/2003 | Kuroyanagi | 358/1.14 |
| 6,553,129 | B1 * | 4/2003 | Rhoads | 382/100 |
| 6,578,072 | B2 * | 6/2003 | Watanabe et al. | 709/217 |
| 6,619,868 | B2 * | 9/2003 | Ishida | 400/76 |
| 6,642,959 | B1 * | 11/2003 | Arai | 348/231.3 |
| 6,647,130 | B2 * | 11/2003 | Rhoads | 382/100 |
| 6,671,731 | B1 * | 12/2003 | Cain | 709/230 |
| 6,704,712 | B1 * | 3/2004 | Bleiweiss | 705/26 |
| 6,715,003 | B1 * | 3/2004 | Safai | 710/33 |
| 6,727,999 | B1 * | 4/2004 | Takahashi | 358/1.15 |
| 6,747,755 | B1 * | 6/2004 | Satomi et al. | 358/1.15 |
| 6,748,296 | B2 * | 6/2004 | Banerjee et al. | 700/241 |
| 6,762,860 | B1 * | 7/2004 | Watanabe et al. | 358/403 |
| 6,766,301 | B1 * | 7/2004 | Daniel et al. | 705/14 |
| 6,775,392 | B1 * | 8/2004 | Rhoads | 382/100 |
| 6,778,289 | B1 * | 8/2004 | Iwata | 358/1.15 |
| 6,789,113 | B1 * | 9/2004 | Tanaka | 709/223 |
| 6,801,962 | B2 * | 10/2004 | Taniguchi et al. | 710/33 |
| 6,807,395 | B2 * | 10/2004 | Iwazaki et al. | 434/350 |
| 6,823,075 | B2 * | 11/2004 | Perry | 382/100 |
| 6,877,031 | B2 * | 4/2005 | Watanabe et al. | 709/217 |
| 6,877,093 | B1 * | 4/2005 | Desai et al. | 713/156 |
| 6,934,048 | B2 * | 8/2005 | Igarashi et al. | 358/1.15 |
| 6,978,380 | B1 * | 12/2005 | Husain et al. | 726/4 |
| 6,990,315 | B2 * | 1/2006 | Izumi | 455/41.1 |
| 7,013,288 | B1 * | 3/2006 | Reifel et al. | 705/26 |
| 7,035,427 | B2 * | 4/2006 | Rhoads | 382/100 |
| 7,039,869 | B2 * | 5/2006 | Smith | 715/716 |
| 7,066,387 | B2 * | 6/2006 | Itoh et al. | 235/382 |
| 7,073,174 | B2 * | 7/2006 | Volkoff et al. | 718/102 |
| 7,079,291 | B2 * | 7/2006 | Ichikawa | 358/402 |
| 7,106,461 | B2 * | 9/2006 | Kakigi et al. | 358/1.12 |
| 7,113,596 | B2 * | 9/2006 | Rhoads | 380/54 |
| 7,136,464 | B2 * | 11/2006 | Satomi et al. | 709/206 |
| 7,190,471 | B2 * | 3/2007 | Sandfort et al. | 358/1.14 |
| 7,221,961 | B1 * | 5/2007 | Fukumoto et al. | 455/557 |
| 7,222,101 | B2 * | 5/2007 | Bishop et al. | 705/51 |
| 7,222,134 | B1 * | 5/2007 | Maruyama et al. | 707/201 |
| 7,228,339 | B2 * | 6/2007 | Yamamoto et al. | 709/217 |
| 7,280,237 | B2 * | 10/2007 | Komiya | 358/1.13 |
| 7,327,478 | B2 * | 2/2008 | Matsuda | 358/1.14 |
| 7,352,485 | B2 * | 4/2008 | Kinoshita | 358/1.15 |
| 7,424,972 | B2 * | 9/2008 | Mateen et al. | 235/379 |
| 7,502,133 | B2 * | 3/2009 | Fukunaga et al. | 358/1.15 |
| 7,611,049 | B2 * | 11/2009 | Drummond et al. | 235/379 |
| 2002/0040346 | A1 * | 4/2002 | Kwan | 705/51 |
| 2002/0051178 | A1 * | 5/2002 | Nakayasu et al. | 358/1.15 |
| 2002/0169623 | A1 * | 11/2002 | Call et al. | 705/1 |
| 2002/0194081 | A1 * | 12/2002 | Perkowski | 705/26 |
| 2003/0002068 | A1 * | 1/2003 | Constantin et al. | 358/1.15 |
| 2003/0047613 | A1 * | 3/2003 | Funamoto et al. | 235/462.01 |
| 2003/0197887 | A1 * | 10/2003 | Shenoy et al. | 358/1.15 |
| 2004/0169876 | A1 * | 9/2004 | Takahashi | 358/1.12 |
| 2004/0233471 | A1 * | 11/2004 | Inoue et al. | 358/1.14 |

FOREIGN PATENT DOCUMENTS

| | | | |
|---|---|---|---|
| EP | 0930774 | A3 | 7/1999 |
| EP | 1298912 | A2 | 4/2003 |
| EP | 1298912 | A3 | 4/2003 |
| JP | 2002-135702 | A | 5/2002 |
| KP | 2000-0050148 | | 8/2000 |
| KP | 2002-0076616 | | 10/2002 |
| WO | WO-02/089463 | A1 | 11/2002 |

\* cited by examiner

FIG. 9

| | | | | | USED TERMINAL No.:14 INDEXPRINT |
|---|---|---|---|---|---|
| | | | | 4 | 00 |
| | | | | 5 | 00 |
| | | | | 6 | 0 |
| | | | | 7 | 1 |
| | | | | 8 | 2 |
| | | | | 9 | 3 |

INDEX PRINT

INDEXPRINT 27.06.97

27.06.97

INDEX PRINT

ID 123456  Password 1101

From:system@print.jp
To:userB@zzz.zzz
Body:PRINT RESERVATION WASRECEIVED FROM
    MR./MS. userA@xxx.xxx
    PRINTING IS POSSIBLE FROM TODAY TO 2003/05/06

To: 0555-47-0123

:PRINT RESERVATION WAS RECEIVED FROM
MR./MS. userA@xxx.xxx PRINTING IS POSSIBLE
    FROM TODAY TO 2003/05/06

```
From:system@print.jp
To:userB@zzz.zzz
Body:PRINT RESERVATION WAS RECEIVED
     FROM MR./MS. userA@xxx.xxx
     PRINTING IS POSSIBLE FROM TODAY TO 2003/05/06
```

FIG. 15

USER MANAGEMENT TABLE

| DESTINATION | ID | PASSWORD | USER DIRECTORY ADDRESS |
|---|---|---|---|
| RECIPIENT B | 123456 | 1101 | |
| RECIPIENT P | 125634 | 2222 | |
| | | | |
| ⋮ | ⋮ | ⋮ | ⋮ |

FIG. 16

CUSTOMER MASTER

| SENDER ID | SENDER NAME | SENDER ADDRESS | TRANSMISSION HISTORY | |
|---|---|---|---|---|
| | | | DESTINATION | DATE AND TIME |
| 123 | SENDER A | userA@xxx.xxx | RECIPIENT B | 2003/05/01 |
| | | | RECIPIENT P | 2003/05/01 |
| 256 | SENDER C | userC@yyy.yyy | RECIPIENT B | 2003/05/02 |
| ⋮ | ⋮ | ⋮ | ⋮ | ⋮ |

PRINTING SERVICE SYSTEM AND PRINTING SERVICE PROGRAM

This Nonprovisional application claims priority under 35 U.S.C. §119(a) on Patent Application No(s). 2003-122034 filed in Japan on Apr. 25, 2003, the entire contents of which are hereby incorporated by reference.

BACKGROUND OF THE INVENTION

1. Field of the Invention

The present invention relates to a printing service system and a printing service program. In particular, the present invention relates to a printing service system and a printing service program for printing an image photographed with a digital camera or the like.

2. Description of the Related Art

In a conventional system, a server placed at a center and photograph vending machines installed at respective places are connected to each other through a high-speed line network. Image information transmitted using a certain photograph vending machine is stored in the center server and an ID and a password are displayed on the photograph vending machine. When the ID and the password are designated using a photograph vending machine and a request to read the image information is issued, after the ID and the password are verified, the image is transmitted to the photograph vending machine and a recipient prints out the image using the photograph vending machine (see JP 2002-135702 A, for instance).

In JP 2002-135702 A above, when a sender wishes to present an image to a third person, after registering the image in the system, the sender needs to communicate the ID and the password displayed on a screen to a recipient using a telephone or the like. Therefore, there is a problem that when the sender forgets the ID and/or the password, forgets about communicating them to the recipient, or wrongly communicates them to the recipient, the third person (recipient) becomes incapable of printing out the image. This problem also occurs when the recipient hears the ID and/or the password mistakenly. With this method of communicating the ID and the password using a telephone, however, the trouble described above frequently occurs.

Also, when printing out the image, the recipient needs to input the ID and the password composed of numerals and alphabets using an input device, such as a keyboard, provided for the photograph vending machine, which leads to a problem that a large load is placed on a user unaccustomed to machine operations and input mistakes deem to frequently occur.

SUMMARY OF THE INVENTION

The present invention has been made in order to solve the problems described above and accordingly has an object to provide a printing service system and a printing service program with which it is possible even for a user unaccustomed to machine operations to print out an image with ease and a security level is maintained while eliminating the necessity to communicate an ID and a password required for the printing out by telephone and also eliminating the necessity to perform the input operation of the ID and the password by a recipient.

With the above object(s) in view, a printing service system according to the present invention includes a server and at least one print terminal connected to the server through a communication network. In the printing service system, the print terminal includes an image data input means for inputting image data and an image data transmission means for transmitting the image data to the server. The print terminal also includes a destination input means for inputting an address of a recipient authorized to print the image data. Also, in the printing service system, the server includes an image data reception means for receiving the image data transmitted by the image data transmission means. The server also includes an ID and password generation means for, when the image data is received, generating an ID and a password for authentication. The server further includes an image data accumulation means for accumulating the received image data in association with the ID. The server also includes a code conversion means for converting the ID and the password into a code storing information on the ID and the password and a code transmission means for transmitting the obtained code to the address inputted by the destination input means. Further, the server includes an image data returning means for, when the print terminal decodes the code to the ID and the password and transmits the ID and the password, performing authentication using the ID and the password and, if a positive authentication result is obtained, reading the image data corresponding to the ID from the image data accumulation means and returning the read image data to the print terminal.

Therefore, it becomes possible even for a user unaccustomed to machine operations to print out an image with ease and a security level is maintained while eliminating the necessity to communicate an ID and a password required for the printing out by telephone and also eliminating the necessity to perform the input operation of the ID and the password by a recipient.

BRIEF DESCRIPTION OF THE DRAWINGS

In the accompanying drawings:

FIG. 9 is an explanatory diagram showing an example of an index print printed by the print terminal in the printing service system of the present invention;

FIG. 15 is an explanatory diagram showing an example of a user management table in the printing service system of the present invention; and FIG. 16 is an explanatory diagram showing an example of a customer master in the printing service system of the present invention.

DETAILED DESCRIPTION OF THE PREFERRED EMBODIMENTS

First Embodiment

Figure 1:
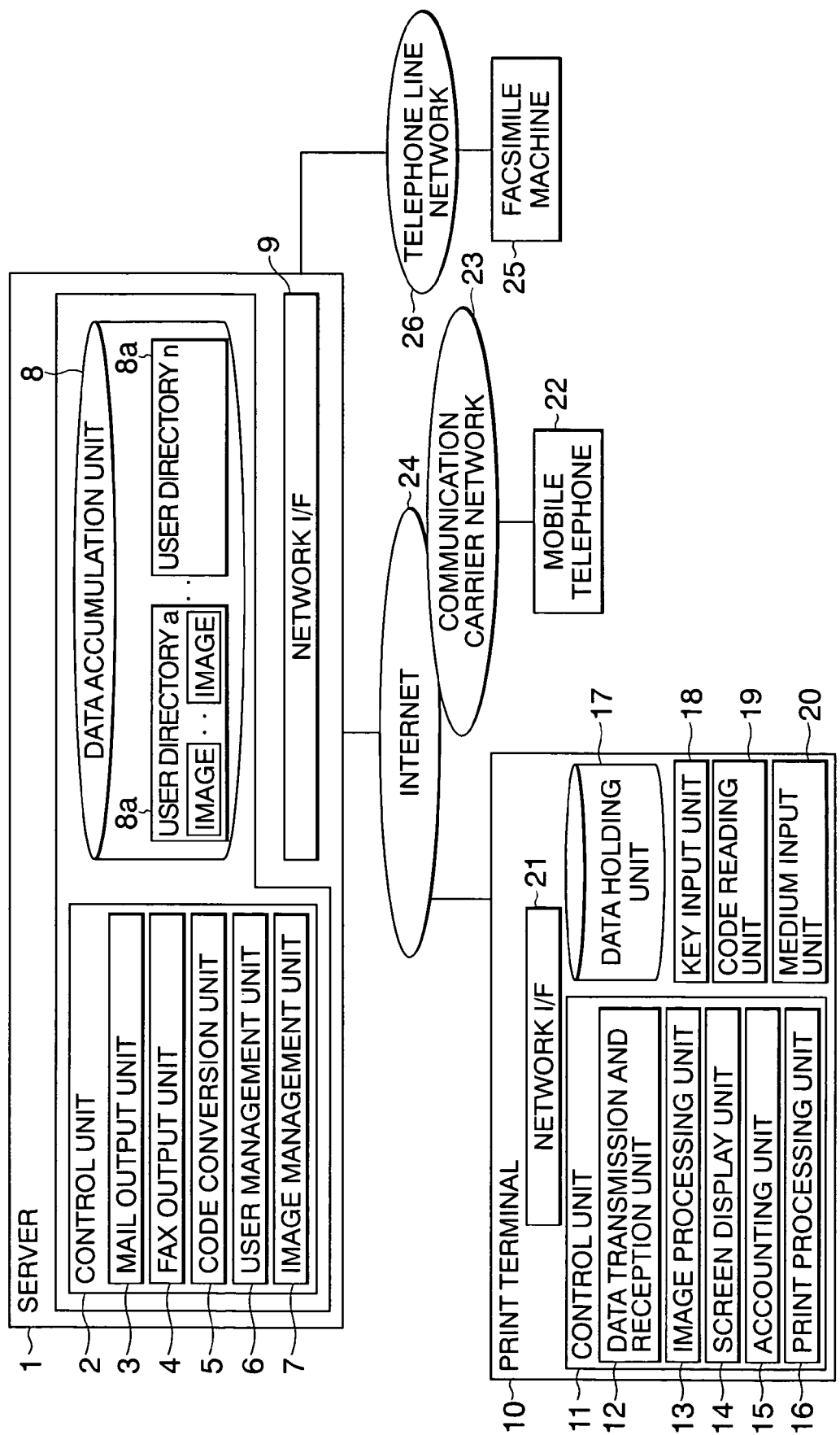
FIG. 1 is a block diagram showing a construction of a printing service system of the present invention.
Figure 2:
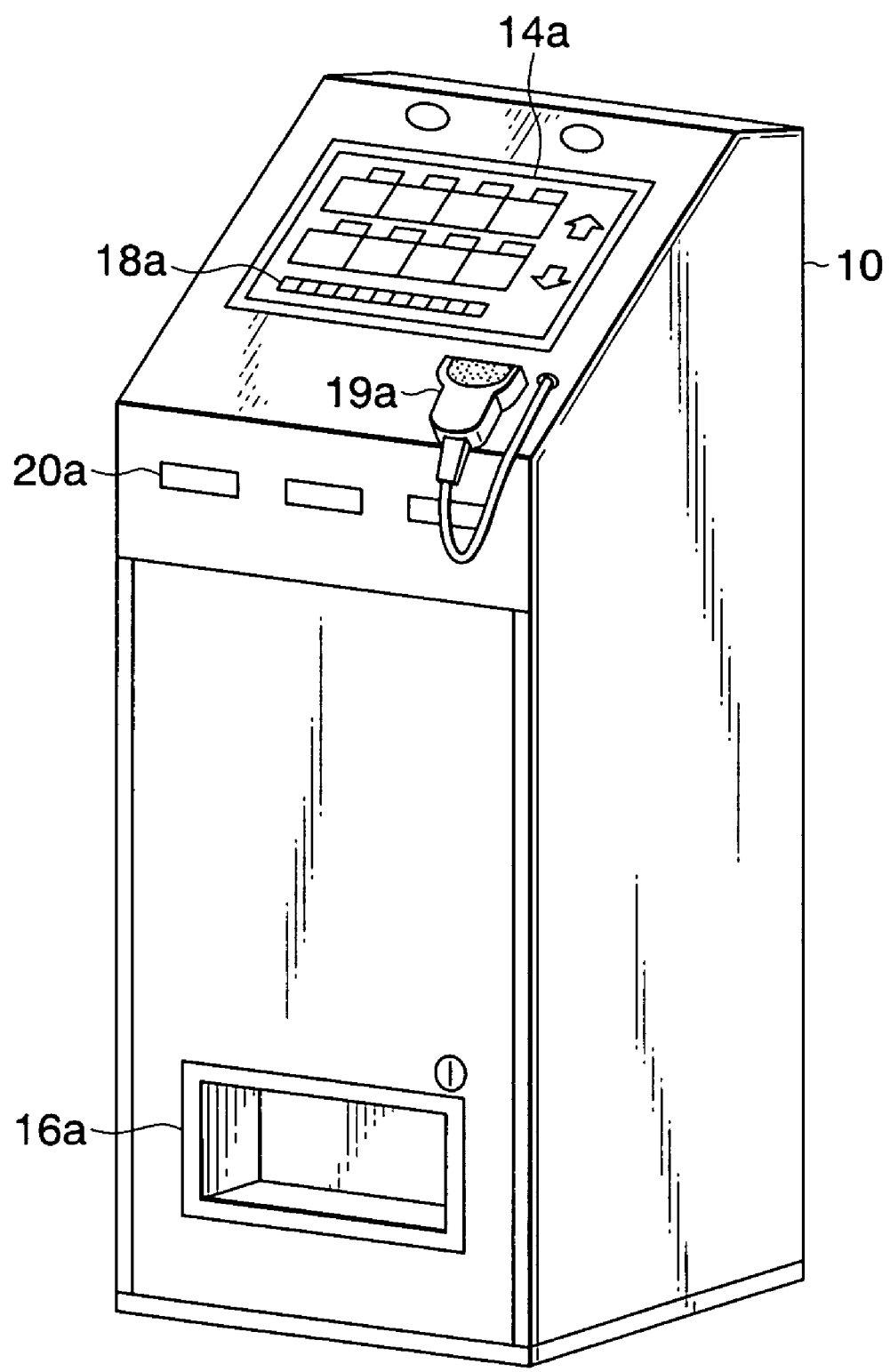
FIG. 2 is a perspective view showing an outer appearance of a print terminal in the printing service system of the present invention.

A construction of a printing service system according to a first embodiment of the present invention will be described. FIG. 1 is a block diagram showing a construction of a printing service system of the present invention and FIG. 2 is an external view of a print terminal 10 used in this printing service system. The printing service system of the present invention has been made by mainly assuming a case where a sender presents an image to a recipient who is a third person.

As shown in FIG. 1, in the printing service system of the present invention, a server 1 and the print terminal 10 installed at each place are connected to each other through a high-speed communication network such as the Internet 24. A mobile telephone 22 possessed by the recipient is connected to the server 1 through a communication carrier network 23 and the Internet 24. Further, a facsimile machine 25 possessed by the recipient is connected to the server 1 through a telephone line network 26.

As shown in FIG. 1, the server 1 includes a control unit 2 that performs control of internal operations, a data accumulation unit 8 in which various kinds of data including image data transmitted by each sender are accumulated, and a network interface 9 for performing transmission and reception of data through the Internet 24. In the data accumulation unit 8, there is created a user directory 8a for storing the image data uploaded from the sender (multiple user directories 8a exist). In the control unit 2, there are provided a mail output unit 3 for creating and outputting a mail addressed to a recipient (authorized to print the image data uploaded from the sender) based on data inputted by the sender, a FAX output unit 4 for creating and outputting a FAX transmission document addressed to the recipient based on data inputted by the sender, a code conversion unit 5 for converting an ID and a password issued by a user management unit 6 to be described later into a code for authentication at the time of printing an image by the recipient, the user management unit 6 for issuing an ID and a password each time a sender uploads an image to the server 1 and creating the user directory 8a corresponding to the ID in the data accumulation unit 8, and an image management unit 7 for storing the uploaded image data in the user directory 8a corresponding to the ID.

Also, the print terminal 10 includes a control unit 11 for performing control of internal operations, a data holding unit 17 for holding data, a key input unit 18 with which key inputs are performed, a code reading unit 19, and a medium input unit 20. In the control unit 11, there are provided a data transmission and reception unit 12, an image processing unit 13, a screen display unit 14, an accounting unit 15, and a print processing unit 16.

Also, as shown in FIG. 2, the print terminal 10 includes a display screen 14a constructed using a touch panel and displaying image data and other various kinds of data, keys 18a displayed on the display screen 14a and used to perform key inputs of various kinds of data, a medium insertion opening 20a through which a medium storing an image is inserted, a taking-out opening 16a for taking out an index print printed out after each image that the sender wishes to transmit is registered in the server 1 by performing image upload processing and also taking out each print image printed by the recipient, and a handy scanner 19a for reading the code for authorization at the time of printing the image by the recipient.

Figure 3:
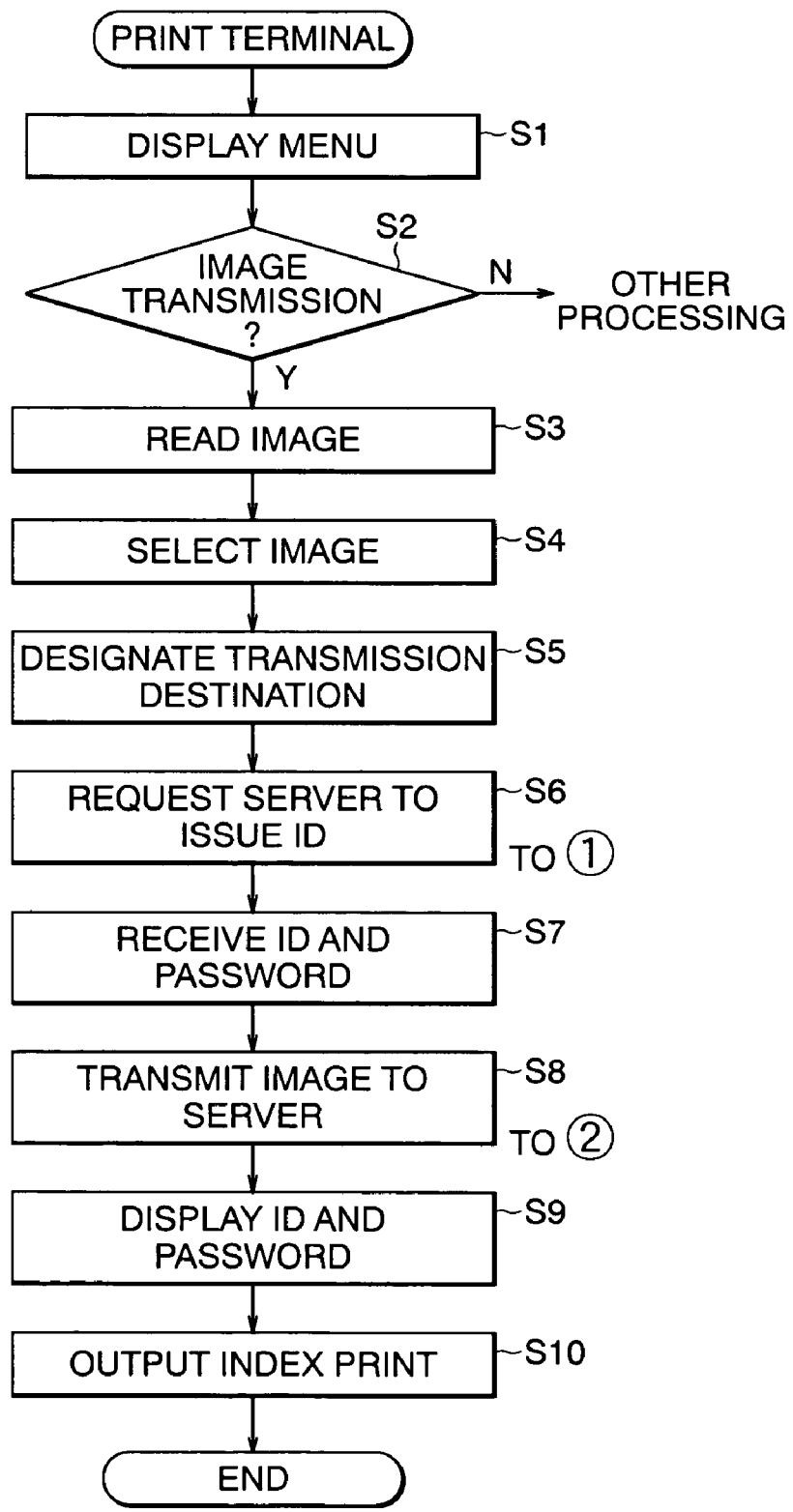
FIG. 3 is a flowchart showing image upload processing on a print terminal side in the printing service system of the present invention.
Figure 4:
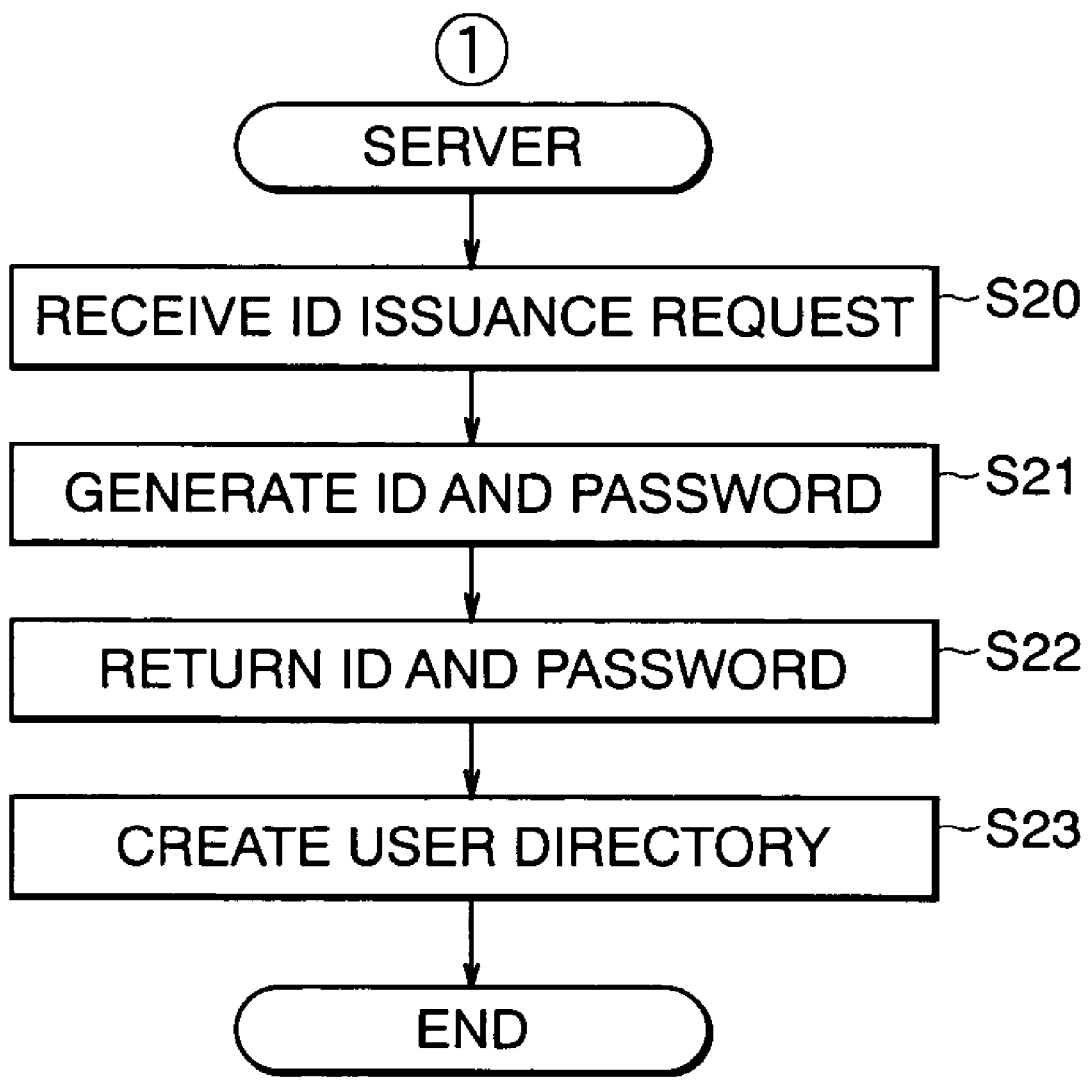
FIG. 4 is a flowchart showing image upload processing on a server side in the printing service system of the present invention.
Figure 5:
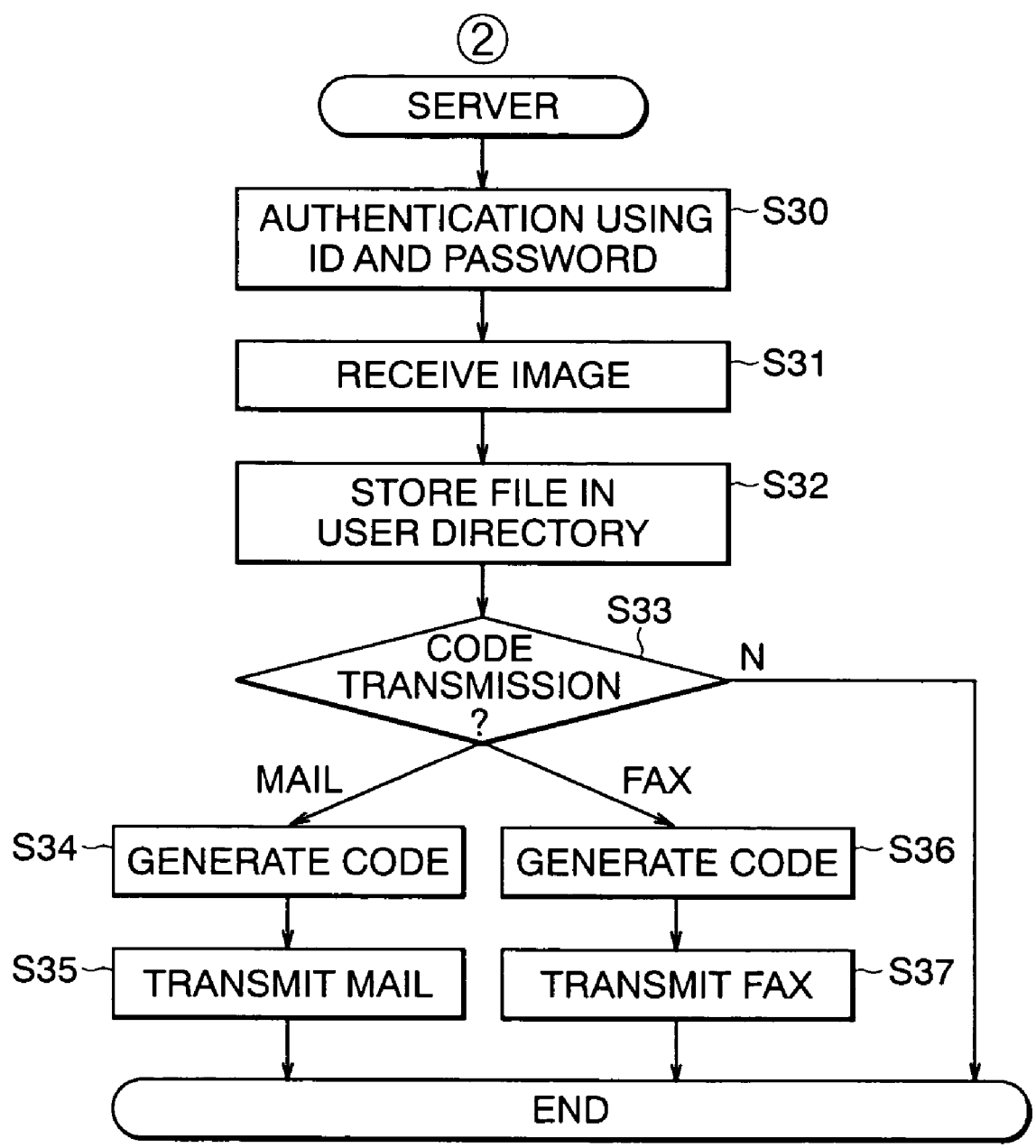
FIG. 5 is a flowchart showing the image upload processing on the server side in the printing service system of the present invention.
Figure 6:
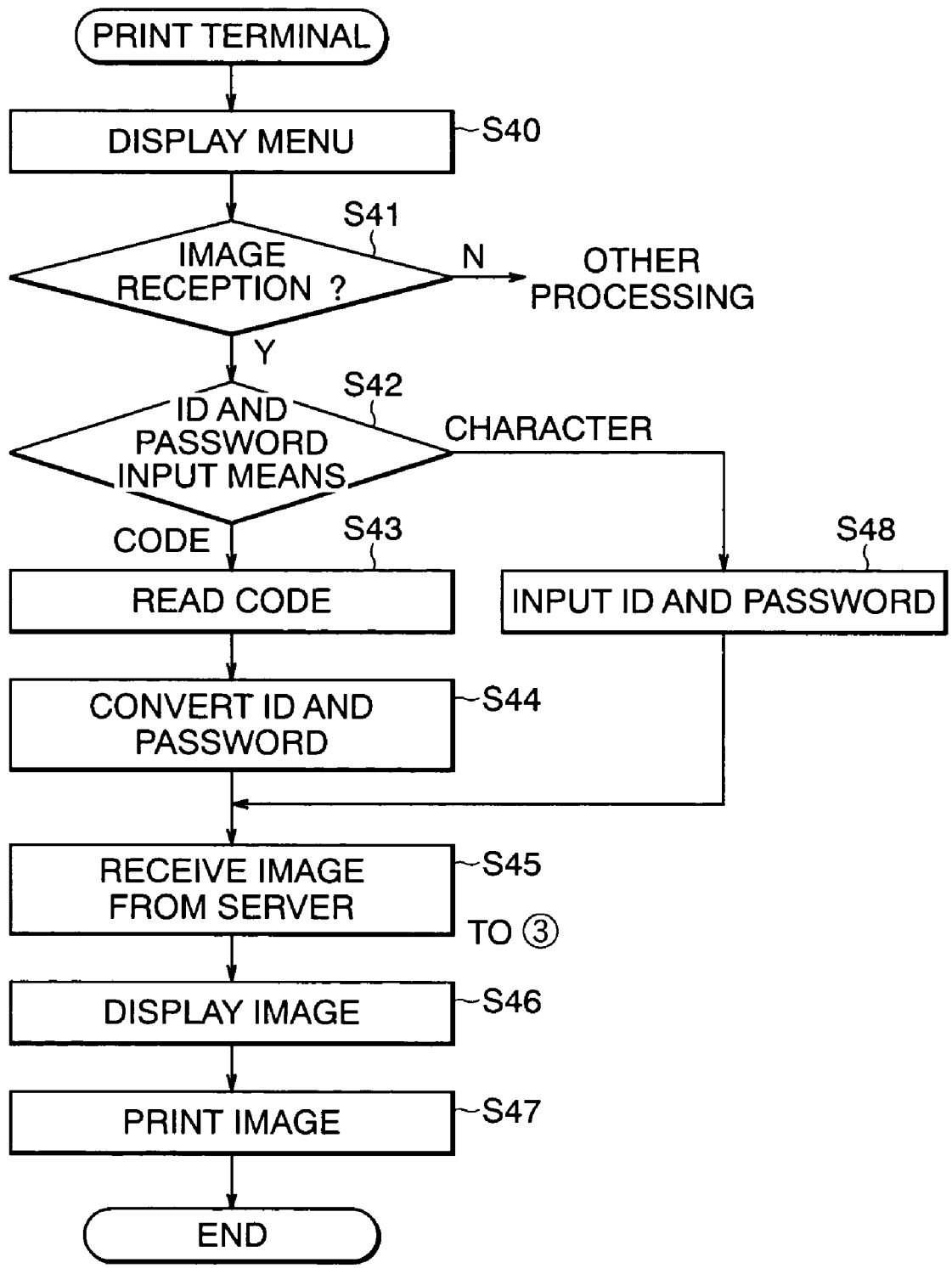
FIG. 6 is a flowchart showing image download processing on the print terminal side in the printing service system of the present invention.
Figure 7:
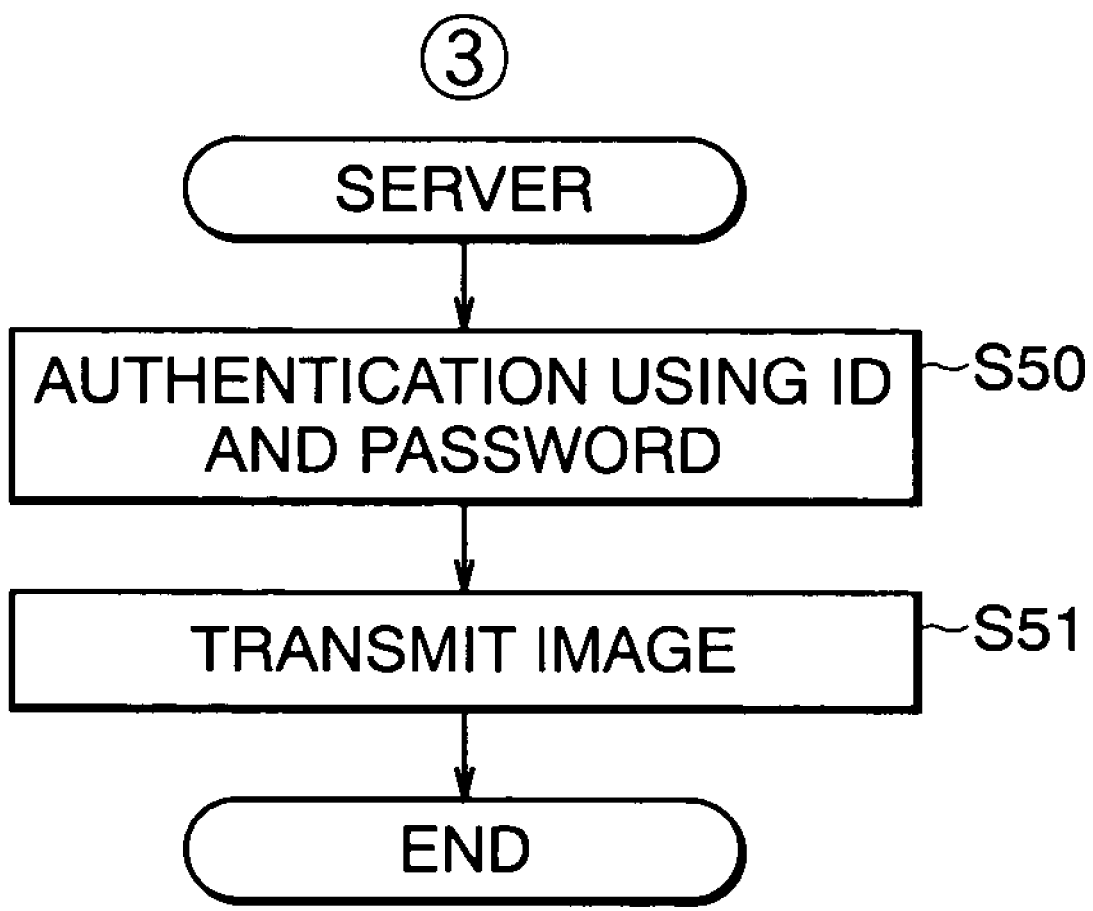
FIG. 7 is a flowchart showing image download processing on the server side in the printing service system of the present invention.

Next, an operation of the printing service system according to this embodiment will be described. FIGS. 3, 4, and 5 are each a flowchart showing image upload processing at the time when a sender registers an image in the system. Also, FIGS. 6 and 7 are each a flowchart showing image download processing at the time when a recipient prints the image.

Figure 8:
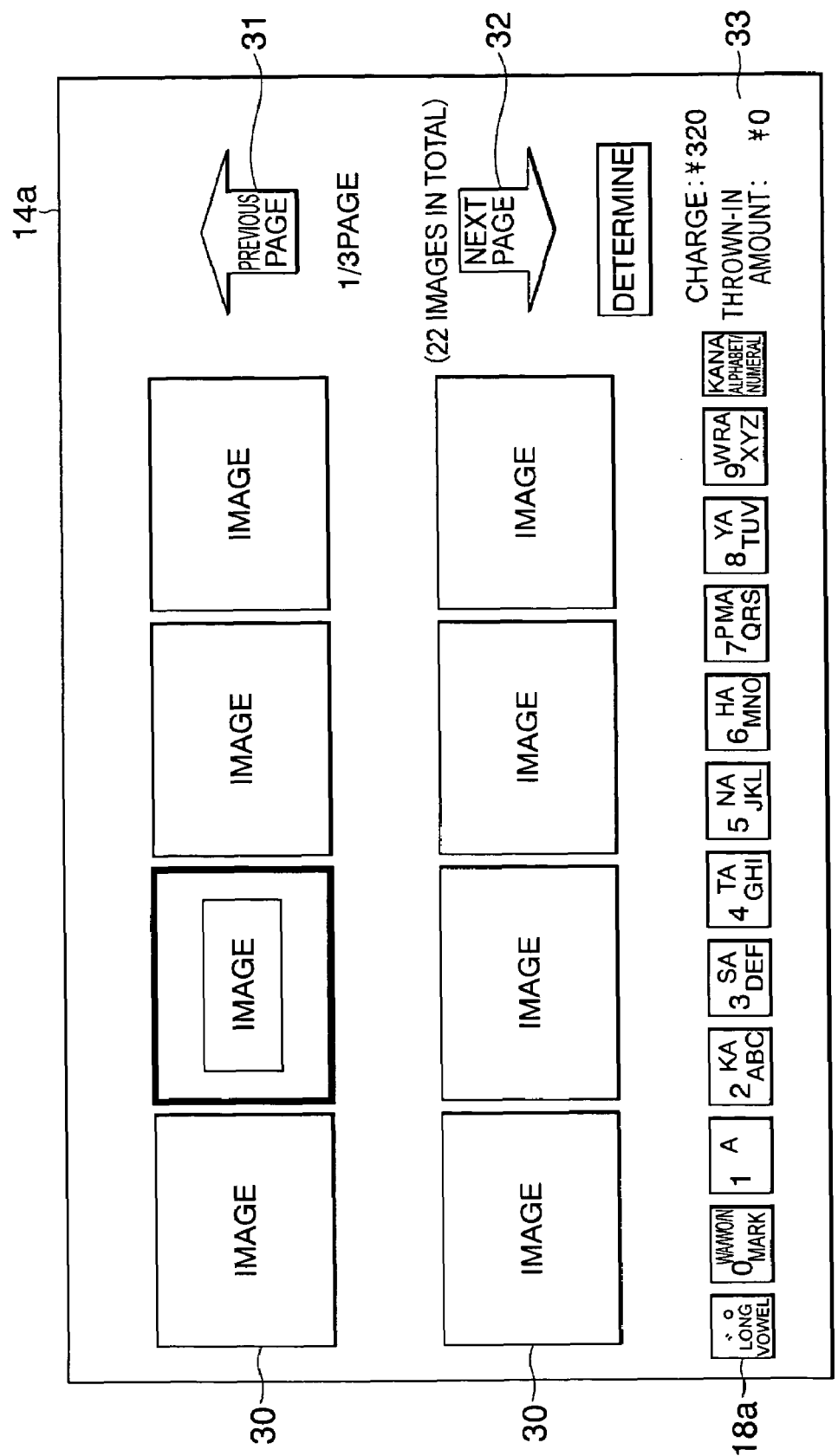
FIG. 8 is an explanatory diagram showing an example of a display screen of the print terminal in the printing service system of the present invention.

Referring to FIG. 3, image upload processing of the print terminal 10 at the time when the sender registers the image in the system will be described. First, as shown in FIG. 3, when the sender gets closer to the print terminal 10, this situation is detected by a sensor and a menu is automatically displayed on the display screen 14a (step S1). Alternatively, when the recipient touches the display screen 14a of the print terminal 10 with hand, this situation is detected and the menu is automatically displayed on the display screen 14a. Next, the sender selects one of image transmission and other processing through the menu (step S2). If the image transmission is selected, the processing proceeds to step S3; if not, the processing proceeds to the other processing. Next, the sender inserts a medium (for instance, a magnetic storage medium such as SmartMedia, SD Card, CompactFlash (trademark), or Memory Stick), on which an image photographed with a digital camera or a camera-equipped mobile telephone is recorded, into the medium insertion opening 20a constituting the medium input unit 20 of the print terminal 10 in order to read the image data stored in the medium (step S3). The read image is displayed on the display screen (FIG. 8 shows an example of the display screen at this time) and each image that should be transmitted is selected by the sender (step S4). The display screen 14a is constructed using a touch panel, so that it is possible to perform the selection operation with ease merely by touching a portion corresponding to the image 30 with finger. When the number of images is too large and it is impossible to display all images on the screen at a time, the sender performs the selection while performing page-turning operations using page-turning buttons 31 and 32. Next, the sender inputs the mail address of the mobile telephone 22 (see FIG. 1) of the recipient or the FAX number of the facsimile machine 25 (see FIG. 1) of the recipient, if necessary, using the keys 18a constituting the key input unit 18 (step S5). Then, the accounting unit 15 of the print terminal 10 displays a message requesting the sender to throw a charge into a coin slot and the data transmission/reception unit 12 of the print terminal 10 transmits an ID issuance request to the server 1 (step S6). In response to this request, the server 1 issues an ID and a password and returns them to the print terminal 10, which then receives the ID and the password (step S7). Next, the image data selected in step S4 is processed by the image processing unit 13 of the print terminal 10 and is transmitted to the server 1 by the data transmission and reception unit 12 (step S8). At this time, the ID and the password received in step S7 are attached to the image data and are transmitted. Next, the ID and the password are displayed for the sender on the display screen 14a (step S9) and an index print of the image data selected and uploaded to the server 1 is printed and outputted (step S10). An example of the index print is shown in FIG. 9. As shown in FIG. 9, the ID and the password are printed in a predetermined field of the index print.

Next, referring to FIG. 4, processing of the server 1 at the time when the sender registers the image in the system will be described. After the print terminal 10 issues an ID issuance request to the server 1 in step S6 in FIG. 3 described above, the server 1 receives this request (step S20) In response to this request, the user management unit 5 of the server 1 generates a new ID and a new password for a recipient designated by the sender (step S21) and the ID and the password are returned to the print terminal 10 (step S22) Note that if multiple recipients are designated, the new ID and the new password are uniquely generated for each recipient. Next, the user management unit 5 of the server 1 creates the user directory for each generated ID in the data accumulation unit 8 in the server 1 (step S23).

Figure 10:
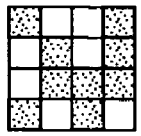
FIG. 10 is an explanatory diagram showing an example of a mail transmitted by the server in the printing service system of the present invention.
Figure 11:
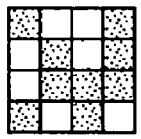
FIG. 11 is an explanatory diagram showing an example of a FAX transmission document transmitted by the server in the printing service system of the present invention.

Next, referring to FIG. 5, processing of the server 1 at the time when the sender registers the image in the system will be described. After the print terminal 10 transmits an image file to the server 1 together with the ID and the password in step S8 in FIG. 3 described above, authentication processing is performed using the ID and the password (step S30), the image file is received (step S31), and the image management unit 7 of the server 1 accumulates the image file in the user directory 8a corresponding to the ID (step S32). Then, it is confirmed which one of e-mail transmission to the recipient and FAX transmission thereto is selected by the sender (step S33). If the mail transmission is selected, the processing proceeds to step S34 in which the code conversion unit 5 converts the ID and the password into a code in which they are embedded (step S34) and the mail output unit 3 creates and transmits a mail for informing the recipient of the code (step S35). An example of the mail is shown in FIG. 10. Note that as shown in FIG. 10, in this embodiment, a two-dimensional code is described as the code in the body of the mail. The two-dimensional code means a code having information in a horizontal direction and a vertical direction, as shown in FIG. 10. The two-dimensional code is a code with which reading mistakes and the like hardly occur at the time of reading with a scanner or the like, so that the two-dimensional code is easy even for a user unaccustomed to machine operations to deal with the code. On the other hand, in step S33, if it is judged that the sender selected the FAX transmission from among the e-mail transmission and the FAX transmission, the processing proceeds to step S36, in which the code conversion unit 5 converts the ID and the password into a code such as the two-dimensional code (step S36). Then, the mail output unit 3 creates and transmits a FAX transmission document for informing the recipient of the code (step S37). An example of the FAX transmission document is shown in FIG. 11.

Figure 12:
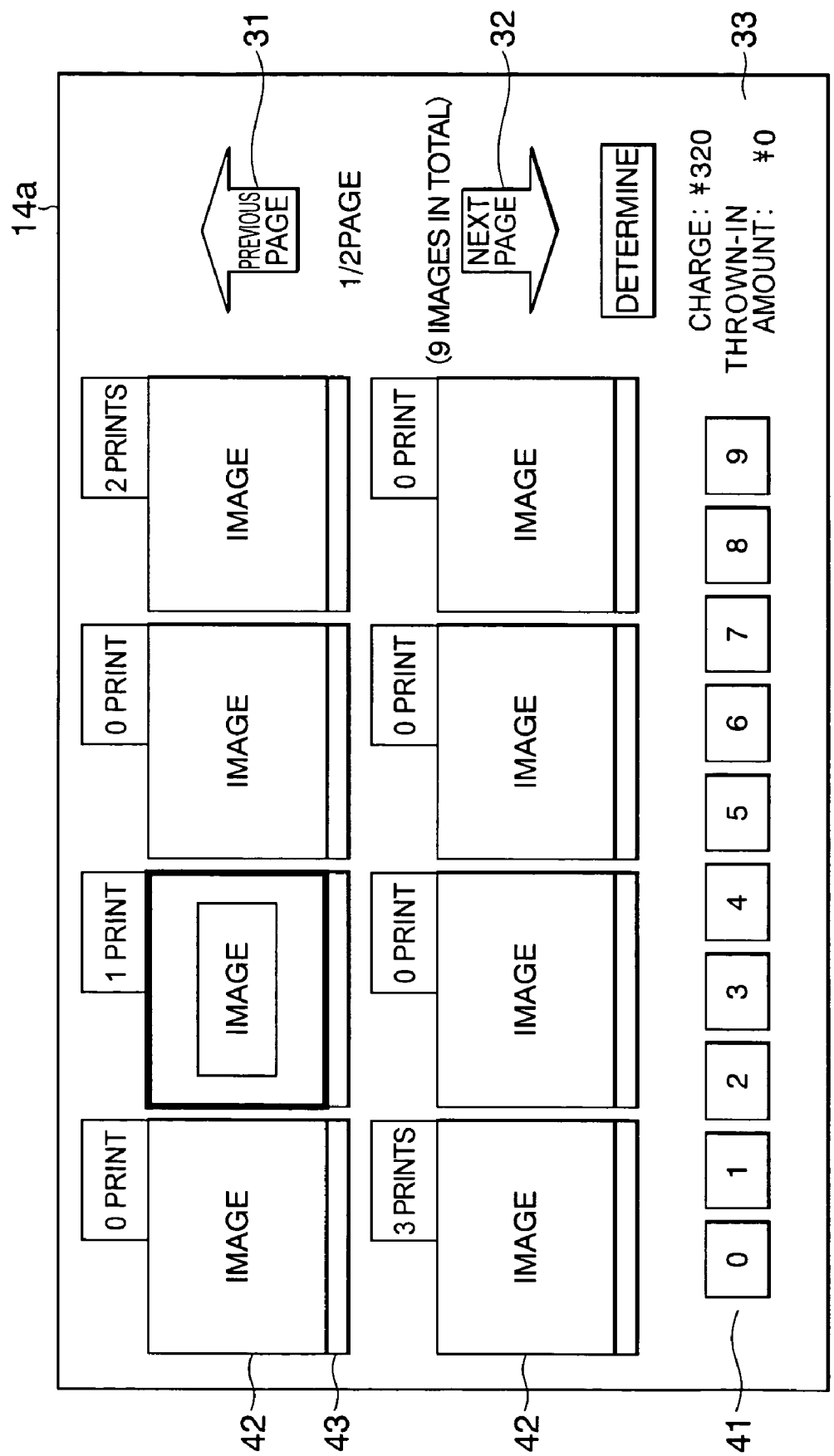
FIG. 12 is an explanatory diagram showing an example of a display screen of the print terminal in the printing service system according to the present invention.

Next, image download processing of the print terminal 10 at the time when the recipient prints the image will be described with reference to FIG. 6. First, as shown in FIG. 6, when the recipient approaches the print terminal 10, this situation is detected by a sensor and a menu is automatically displayed on the display screen 14a (step S40). Alternatively, it is possible that when the recipient touches the display screen 14a of the print terminal 10 with hand, this situation is detected and the menu is automatically displayed on the display screen 14a. Next, the recipient selects one of image reception and other processing through the menu (step S41). If the image reception is selected, the processing proceeds to step S42; if not, the processing proceeds to the other processing. It is judged whether the recipient inputs the code for authentication of printing using the mail received by the mobile telephone or paper outputted by the FAX or he/she inputs the ID and the password using the keys (step S42). If the code input is selected, the processing proceeds to step S43; if the key input is selected, the processing proceeds to step S49. That is, in the case of the code input, the handy scanner 19a constituting the code reading unit 19 of the print terminal 10 is set closer to the code in the mail displayed on the display screen or the code printed on a paper document received with the FAX, and the code is read (step S43). The print terminal 10 decodes the code to the ID and the password (step S44) and downloads the corresponding image file from the user directory 8a of the data accumulation unit 8 of the server 1 (step S45). When the recipient throws a predetermined amount of money into the accounting unit 15, the image uploaded by the sender is displayed on the display screen 14a (step S46). An example of the display screen 14a at this time is shown in FIG. 12. The recipient selects each image 42 that he/she wishes to print by touching the image with finger, designates the number of prints to be made for each selected image using the ten key pad 41, and prints out the image (step S47). Note that reference numeral 43 denotes an attribute data display field in which, for instance, attribute information (such as the name, nickname, or mail address of the sender), with which it is possible to identify the sender, is displayed.

Next, image download processing of the server 1 at the time when the recipient prints the image will be described with reference to FIG. 6. After the ID and the password are transmitted to the server 1 in step S45 in FIG. 6 described above, the server 1 receives them and performs authentication processing (step S50). Next, the corresponding image file is downloaded from the user directory 8a of the data accumulation unit 8 of the server 1 and is printed out (step S51).

As described above, in the printing service system according to this embodiment, a sender uploads an image photographed with a digital camera or a camera-equipped mobile telephone to the server 1 using the print terminal 10. Then, the server 1 generates an ID and a password and the ID and the password are printed out in order to prevent a situation where the sender forgets them. In addition, a code, in which the ID and the password are embedded, is communicated to a recipient of the image designated by the sender by mail or FAX. Therefore, it becomes possible to automatically and correctly inform the recipient of the code that is print information required for printing out. As a result, it becomes possible to present the image to the recipient with reliability. Also, unlike in a conventional case, the recipient does not have to input the ID and the password and it is possible for him/her to print the presented image with ease merely by reading the screen of a mobile telephone displaying the code or a FAX reception document using the handy scanner 19a or the like of the code reading unit 19 of the print terminal 10.

Second Embodiment

Figure 13:
FIG. 13 is an explanatory diagram showing an example of a mail transmitted by the server in the printing service system of the present invention.

In the first embodiment described above, the two-dimensional code is used as the code. In this embodiment, however, a barcode shown in FIG. 13 is used. The two-dimensional code has an advantage in that reading mistakes hardly occur but has a disadvantage in that the handy scanner or the like is high-priced. On the other hand, in the case of the barcode, it is possible to construct the system with low-priced devices, although when the barcode is transmitted by FAX or the like, the barcode becomes unclear and reading mistakes tend to occur. It is sufficient that which one of the codes is selected and used be determined as appropriate in view of the advantages and disadvantages of these codes at the time of designing the system.

Third Embodiment

It is assumed that multiple print terminals 10 be installed at respective sites for the convenience of users.

For instance, in order to allow the sender or the recipient to identify the installation places of the print terminals 10, it is possible that a Web site corresponding to each mobile telephone carrier is provided in the server 1 and a user, who wishes to use the printing service, identifies the installation places by accessing the Web site through the Internet. When the access is performed, a usage guidance screen containing information showing the installation places of the print terminals 10 is displayed on the screen of the mobile telephone possessed by the user. With this construction, it becomes possible for the user to find the installation places with ease.

Figure 14:
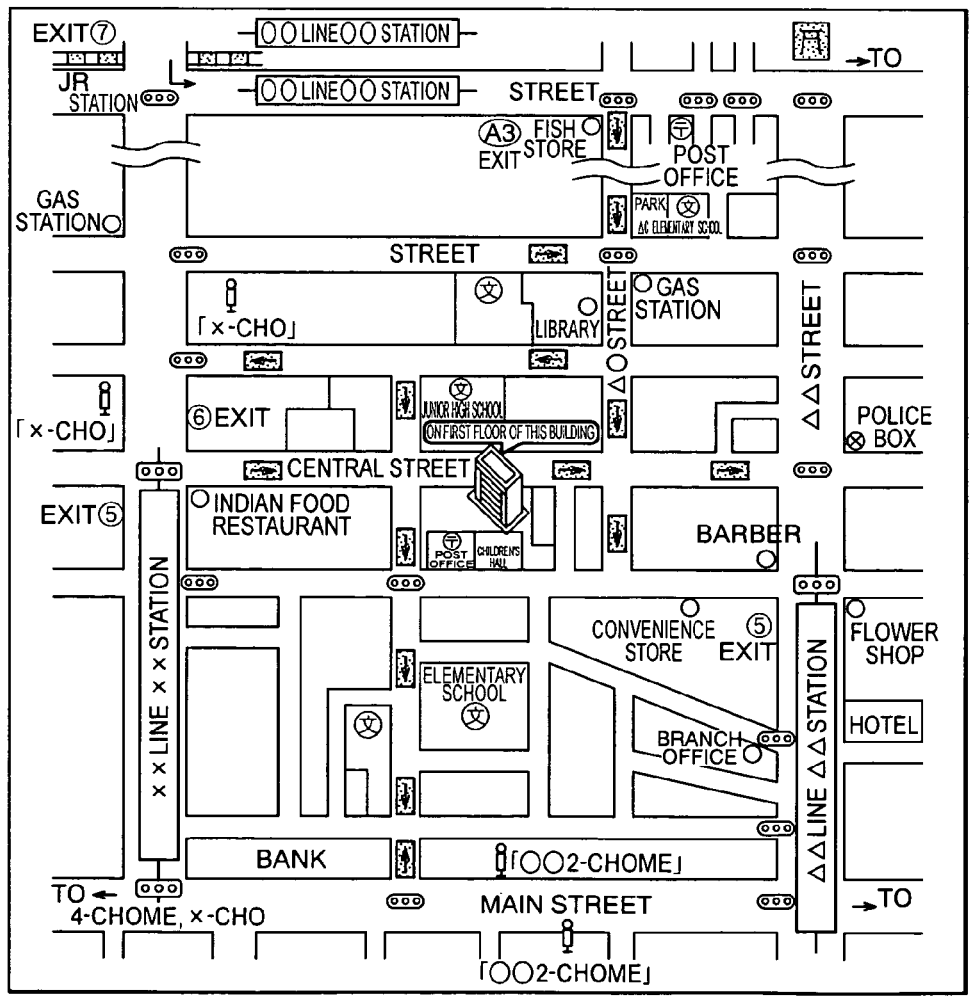
FIG. 14 is an explanatory diagram showing an example of a map illustrating the installation place of the print terminal and attached to the FAX transmission document transmitted by the server in the printing service system of the present invention.

Also, when a recipient is not a mobile telephone user but is a FAX user, a map showing the installation place of a print terminal 10 in the vicinity of the home or place of business of the recipient is simultaneously transmitted along with the FAX transmission document shown in FIG. 11. An example of the map is shown in FIG. 14. Such map data is generated in advance and is stored in the data accumulation unit 8 of the server 1. Here, as a method for finding the print terminal 10 in the vicinity of the home or business place, for instance, the address of the home or business place is found using a FAX number. Alternatively, the sender may designate a desired prefecture or municipality therein. With this construction, it becomes possible for the user to know the installation place with ease. Also, there may be used a construction where a FAX automatic guidance service means is provided in the server 1, thereby allowing the user to get a list of addresses of the installation places of the print terminals 10 by FAX.

Fourth Embodiment

In this embodiment, in addition to the constructions in the first to third embodiments described above, there is further provided a construction with which it is possible for the sender to attach a simple message or subject for communicating the contents of the image uploaded to the server 1 attribute information at the time when the code is transmitted to the recipient as by mail or FAX. Alternatively, image data on the index print shown in FIG. 9 may be attached and transmitted. With this construction, before the recipient goes to the place of the print terminal 10, at a point in time when a mail or a FAX is received, he/she is capable of roughly knowing the contents of the image data.

It should be noted here that the message or subject may be displayed in the attribute data display field 43 (see FIG. 12) of the screen 14a of the print terminal 10 at the time when the recipient performs printing out. This construction is convenient because it enables the recipient to know the contents of the image with ease at the time of image printing.

Fifth Embodiment

In the first embodiment described above, there has been described an example where each time a sender uploads an image, a new ID and a new password are issued and the user directory 8a is created for each issued ID. In this embodiment, however, a user management table shown in FIG. 15 is provided in the server 1. With this construction, each time a sender uploads an image, it is checked whether an inputted destination is the same as any one of the destinations already inputted, and if the same destination exists, the image is stored in the same user directory 8a. As shown in FIG. 15, the user management table stores information with which it is possible to specify a destination (such as the mail address, FAX number, or name of the recipient), the ID, the password, and the address of the user directory corresponding to the ID in the server 1.

That is, first, when a sender A uploads an image X to the server 1 in order to present the image X to a recipient B, a new ID and a new password are issued, a user directory 8a corresponding to the ID is created, and the image X is stored in the created user directory 8a. Following this, when a different sender C uploads an image Y to the server 1 in order to present the image Y to the same recipient B, the server 1 searches the user management table in FIG. 15, confirms that the user directory 8a for the recipient B has already been created, and stores the image Y in the user directory 8a using the ID and the password already issued to the recipient B without issuing a new ID and a new password.

This construction makes it possible to create one user directory 8a for each recipient in the server 1 and therefore eliminates the need for creating multiple user directories 8a for the same recipient. As a result, it becomes possible to reduce the number of user directories 8a.

It should be noted here that in this embodiment, each code transmitted by mail or FAX to the same recipient becomes the same, so that at the time of transmission of the code by mail or fax, there may be simultaneously informed that the code is the same as previous ones. That is, in the example described above, the code to be transmitted by mail or FAX to the recipient B at the time when the sender C uploads the image becomes the same as the code transmitted by mail or FAX to the recipient B at the time when the sender A uploaded the image. Therefore, when the sender C uploads the image and the code is transmitted to the recipient B by mail or fax, a message informing that the code transmitted this time is the same as the code transmitted when the sender A uploaded the image is described in a mail or a FAX transmission document received by the recipient.

In this embodiment, each image addressed to the same recipient is stored in the same user directory 8a, so that when the recipient reads the code using the print terminal 10, images from respective senders are simultaneously displayed on the display screen shown in FIG. 12. As a result, it becomes possible for the recipient to print out the images from all senders by one operation. By displaying data, such as a name or a mail address, which identifies each sender in the attribute data display field 43 shown in FIG. 12 or by displaying a subject or a message indicating the contents of each image therein, it becomes possible for the recipient to know the sender of each image with ease.

Sixth Embodiment

In this embodiment, in addition to the constructions in the first to fifth embodiments described above, a customer master shown in FIG. 16 is further provided. The customer master may be provided in the server 1 or in the print terminal 10. The customer master stores a sender ID, a sender name (or nickname), a sender mail address, and a transmission history (destination (such as a mail address or a FAX number) and transmission date and time). Note that it is assumed that the sender ID be issued to the sender by the server 1 or the print terminal 10 having the customer master.

With this construction, once the sender is registered in the customer master, he/she is merely required to input his/her sender ID from the next time of use. That is, even if information on the sender, such as his/her mail address or name, is not inputted, it is automatically found. As a result, an operation load placed on the sender is reduced and the operations are simplified. Further, there is the possibility that the sender frequently performs transmission to the same recipient. In this case, it is possible to use a construction where when the sender inputs his/her sender ID, a list of previous transmission destinations is displayed on the display screen 14a based on the transmission history and the sender selects and designates a person, to whom he/she wishes to transmit an image, from the list. In this case, the operability is further improved.

Seventh Embodiment

In the first to sixth embodiments described above, there has been described a method with which a code is transmitted to the recipient by mail or fax. In this embodiment, however, there will be described a method with which it is confirmed whether the recipient received the mail or the FAX without any troubles.

As a first method, an operation for displaying a transmission result on the display screen 14a may be performed between the step S9 and step S10 shown in FIG. 3, thereby informing the sender of the transmission result.

As a second method, at the time of uploading an image to the server 1, a sender mail address or a sender FAX number may be inputted. In this case, the server 1 transmits the transmission result to a destination identified by the sender mail address or the sender FAX number.

This construction is convenient because this construction makes it possible for the sender to know whether a mail or a FAX reached without any troubles.

Eighth Embodiment

In this embodiment, in addition to the constructions in the embodiments described above, a mail or FAX retransmission service means is further provided in the server 1.

In this embodiment, there are assumed a case where a recipient erroneously deleted the code received by mail, a case where he/she lost the code received by fax, a case where the received code is unclear, and the like. In such cases, the server 1 is requested to perform retransmission by mail or FAX and transmits the code again to a destination designated at the time when the retransmission is requested. This construction is convenient because, even if a received code is unusable, it becomes possible to request the server 1 to transmit the code again.

It should be noted here that even if such a retransmission service means is not used, it is possible to attain the same effect using the ID and the password printed in the predetermined field of the index print shown in FIG. 9 printed out for the sender in step S10 in FIG. 3. In this case, the recipient makes contact with the sender, requests him/her to give the ID and the password, and inputs them using the keys 18a or 41 of the print terminal 10. In this manner, it becomes possible for the recipient to perform the printing of an image even if the code is not used.

Ninth Embodiment

In the first to eighth embodiments described above, a case where a mobile telephone is used as a terminal that receives an e-mail has been described as an example. However, the present invention is not limited to this and the e-mail may be received by a terminal such as a personal computer. In this case, the recipient prints the code for authentication described in the e-mail on a paper medium using a printer device connected to the personal computer, brings the paper medium to the place of the print terminal 10, and performs reading of the code using the handy scanner 19a.

What is claimed is:

1. A printing service system comprising:
   a server; and
   at least one print terminal connected to the server through a communication network, the print terminal including:
      an image data input means for inputting image data;
      an image data transmission means for transmitting the image data to the server; and
      a destination input means for inputting an address of a recipient authorized to print the image data, and
   the server including:
      an image data reception means for receiving the image data transmitted by the image data transmission means;
      an ID and password generation means for generating an ID and a password for authentication when the image data is received;
      an image data accumulation means for accumulating the received image data in association with the ID;
      a code conversion means for converting the ID and the password into a code for authentication at a time of printing the image data by the recipient, wherein information on the ID and the password is encrypted into the code;
      a code transmission means for transmitting the obtained code to the address inputted by the destination input means; and
      an image data returning means for, when the print terminal decodes the code to the ID and the password and transmits the ID and the password, performing authentication using the ID and the password and, if a positive authentication result is obtained, reading the image data corresponding to the ID from the image data accumulation means and returning the read image data to the print terminal.

2. A printing service system according to claim 1, wherein:
   the address of the recipient is an e-mail address of the recipient; and
   the code transmission means transmits the code by e-mail.

3. A printing service system according to claim 1, wherein:
   the address of the recipient is a FAX number of the recipient; and
   the code transmission means transmits the code by fax.

4. A printing service system according to claim 1, wherein the code is composed of one of a two-dimensional code and a barcode.

5. A printing service system according to claim 1, wherein:
   the print terminal further includes:
   a code reading means for reading the code;
   a code decoding means for decoding the read code so as to return it into the ID and the password;
   an image data acquiring means for transmitting the ID and the password to the server and receiving the image data corresponding to the ID returned by the image data returning means of the server; and a print means for printing the received image data.

6. A printing service system according to claim 1, wherein the server includes a Web site showing an installation place of the print terminal.

7. A printing service system according to claim 3, wherein when transmitting the code by fax, the code transmission means attaches a map illustrating an installation place of the print terminal in the vicinity of an installation place of a facsimile machine on a recipient side.

8. A printing service system according to claim 1, wherein:
the print terminal further includes an attribute information input means for, when transmitting the image data to the server using the image data transmission means, inputting attribute information to be attached to the image data; and
the image data accumulation means of the server stores the attribute information together with the image data.

9. A printing service system according to claim 8, wherein the code transmission means of the server transmits the attribute information to the address of the recipient together with the code.

10. A printing service system according to claim 8, wherein the image data returning means of the server transmits the attribute information to the print terminal together with the image data.

11. A printing service system according to claim 1, wherein the server further includes a user management table in which the ID, the password, and an address of a user directory storing the image data in the image data accumulation means are stored in association with information about the address of the recipient.

12. A printing service system according to claim 1, further comprising:
a customer master that is provided for one of the server and the print terminal and stores a transmission history in association with a corresponding sender ID.

13. A printing service program stored on a computer readable medium for causing a computer to execute processing to translate instructions for displaying image data comprising the steps of:
transmitting image data from a print terminal to a server;
inputting an address of a recipient authorized to print the image data into the print terminal;
receiving by the server the image data transmitted from the print terminal in the image data transmission step;
generating an ID and a password for authentication by the server when receiving the image data;
accumulating by the server the received image data in association with the ID;
converting by the server the ID and the password into a code for authentication at a time of printing the image data by the recipient, wherein information on the ID and the password is encrypted into the code;
transmitting the code by the server to the address inputted in the address input step;
decoding by the print terminal the code so as to return it into the ID and the password and transmit the ID and the password to the server;
performing authentication by the server using the ID and the password obtained through decoding;
reading by the server, if a positive authentication result is obtained in the authentication step, the image data corresponding to the ID accumulated in the server in the image data accumulation step; and
returning by the server the read image data to the print terminal.

* * * * *